US006503963B2

(12) United States Patent
Toyoda et al.

(10) Patent No.: US 6,503,963 B2
(45) Date of Patent: Jan. 7, 2003

(54) RADIOWAVE ABSORBENT AND MANUFACTURING METHOD THEREOF

(75) Inventors: Junichi Toyoda, Tokyo (JP); Sakan Iwashita, Kanagawa (JP); Katsumi Okayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/733,375

(22) Filed: Dec. 8, 2000

(65) Prior Publication Data

US 2001/0020054 A1 Sep. 6, 2001

(30) Foreign Application Priority Data

Dec. 8, 1999 (JP) .......................................... 11-349168

(51) Int. Cl.[7] ............................ B32B 7/02; G21K 1/10; C08K 3/10

(52) U.S. Cl. ....................... 523/137; 524/434; 524/435; 428/212

(58) Field of Search .......................... 523/137; 524/434, 524/435; 428/212

(56) References Cited

U.S. PATENT DOCUMENTS

| | | | | |
|---|---|---|---|---|
| 4,816,614 | A | * | 3/1989 | Baigrie et al. |
| 5,841,067 | A | * | 11/1998 | Nakamura et al. |
| 6,136,429 | A | * | 10/2000 | Saito |

* cited by examiner

*Primary Examiner*—Tae H. Yoon
(74) *Attorney, Agent, or Firm*—Sonnenschein, Nath & Rosenthal

(57) ABSTRACT

A radio wave absorbent capable of absorbing radiowaves in the space saving and efficient manner and capable of coping with up to high frequency bands, as well as a manufacturing method thereof are provided. In a radio wave absorbent in which magnetic particles comprising a soft magnetic metal material are mixed with a matrix of a polymeric material or ceramics, the magnetic particles are formed into elliptic plate particles.

11 Claims, 3 Drawing Sheets

RADIOWAVE ABSORBENT AND MANUFACTURING METHOD THEREOF

BACKGROUND OF THE INVENTION

1. Field of the Invention

This invention relates to a radio wave absorbent and a manufacturing method thereof. More specifically, it relates to a radiowave absorbent comprising a mixture of magnetic particles and a resin material or ceramic material and a manufacturing method thereof.

2. Description of the Related Art

In electronic equipments or communication systems, radiowave absorbents have been used for absorbing radiowaves from the outside which constitute external disturbances or radiowaves leaking from the inside, to prevent noises or radiowave interference thereby obtaining stable functions. For such radiowave absorbents, those radiowave absorbents comprising sintered spinel type ferrite, sintered ferrite of hexagonal system or flaky soft magnetic metal materials formed into particles and mixing the particles with a resin into a composite material have been put to practical use so far. Existent radiowave absorbents described above absorb radiowaves in wave bands of several MHz to several GHz.

Material parameters relevant to the characteristics in such radio wave absorbents are complex dielectric constant $\epsilon$ and complex permeability $\mu$ at high frequency. Among them, $\mu''$ as the imaginary component of the complex permeability $\mu$ ($=\mu'-j\mu''$) concerns the radiowave absorption characteristics in the radiowave absorbents in magnetic materials.

However, since reduction of the size and increase in the working frequency have been progressed for the equipments, problems in view of electromagnetic wave circumstances such as noises emitted from printed circuit board that give undesired effects on other equipments or erroneous operation caused by external electromagnetic waves have become serious. As the countermeasure, methods of changing the wiring pattern of printed circuit boards or using parts for countermeasure have been predominant. The methods involve drawbacks such as requirement for the cost of modifying the design or parts, or taking much time for obtaining products.

On the other hand, since radiowave absorbents that absorb unnecessary electromagnetic waves and convert them into heat lead to reduction of causal noises per se, it is said that they are useful for the drastic solution of the problems in view of the electromagnetic wave circumstance. However, the size of the equipments has been reduced more and more, the mounting density of various semiconductor devices mounted on substrates has been increased outstandingly, and the electromagnetic wave circumstance has been worsened, so that the space for disposing absorbents for the countermeasure has been decreased further.

In order to solve them, it is necessary to increase the radiowave absorbing performance of the radiowave absorbents. Further, as seen in the trend of using GHz band for CPU, working frequency has become higher and increase of the frequency has been demanded strongly also for the radiowave absorbents.

In view of the above, for radiowave absorption sheets or electromagnetic interference suppressor sheet as EMC (electromagnetic compatibility) countermeasure for keeping the electromagnetic circumstance appropriate, radiowave absorbents formed by compositing a spinel type ferrite powder or a flat soft magnetic metal powder with a resin into a composite magnetic material has been developed. However, there has been a limit for the applicable frequency, that is, up to 1 GHz for the spinel type ferrite and up to several GHz for the soft magnetic metal. For solving the problem, the present inventors have developed a radiowave absorbent using soft magnetic metal powder of a disk-like shape, which can increase the applicable frequency to a high frequency band of 10 GHz or higher.

FIG. 7 is a schematic view for preparing a disk-like magnetic material from a thin film.

As shown in the figure, a disk-like magnetic material is obtained by forming a thin film by way of to a base film 1 by way of a mask 2 using, for example, sputtering, vapor deposition or CVD. The drawing shows a vapor deposition process using an Ar beam 4 in which a material such as an Fe based magnetic material is used as a target 3. At first, molten metal is evaporated from the target 3 made of an Fe based magnetic material by way of a mask 3 formed with a pattern of a plurality of apertures (not illustrated) and deposited on the base film 1.

Successively, the mask 2 is removed. Then, fine disk-like particles 5 as the metal magnetic material of the disk shape are deposited and remain on the base film 1. The disk-like fine particles 5 are peeled from the base film 1 to prepare a disk-like metal magnetic material. However, the method of preparing the magnetic material from the thin film involves a problem of requiring much cost.

FIG. 8 is a schematic view for manufacturing disk-like magnetic material from fine spherical powdery particles.

As shown in the drawing, spherical particles 7 are prepared by an atomizing method or a chemical deposition method. In the chemical deposition method, an iron metal salt is reduced to deposit fine iron particles. The atomizing method is to be described later. The spherical particle 7 can be formed while properly adjusting the diameter about from several hundreds nm to several tens $\mu$m depending on the design conditions of the radiowave absorbents used. Such spherical particles are crushed by applying a physical force of a stamp mill to form fine flat disk-like particles 8.

However, the method of preparing the flat powder from the spherical powder involves a problem that the yield of the powder with a uniform grain size and well arranged disk-like shape is low.

Further, while the method described above can obtain high permeability as shown by the following formula (1) expressing the product of the resonance frequency and the permeability but the resonance frequency is low. Accordingly, it can not cope with such high frequency band in excess of 10 GHz to be expected in the feature.

$$f_r(\mu_r - 1) = \frac{\gamma \cdot I_s}{3\pi\mu_0}\left(\frac{1}{2}\sqrt{\frac{H_{A1}}{H_{A1}}} + \frac{1}{2}\sqrt{\frac{H_{A2}}{H_{A1}}}\right) \quad (1)$$

in which fr: magnetic resonance frequency, $\mu$r: complex permeability, $\gamma$: gyro magnetic constant, Is: saturated magnetization, $\mu$0: permeability in vacuum ($\mu0=4\pi\times10^{-7}$), HA1:anisotropy within the plane of the disk, HA2:anisotropy in the direction vertical from the plane of the disk.

This invention has been accomplished in view of the foregoing prior art and intends to provide a radiowave absorbent capable of efficiently absorbing radiowaves even in a saved space and coping with high frequency band, as well as a manufacturing method thereof.

For attaining the foregoing object, the present invention provides a radiowave absorbent in which magnetic particles comprising a soft magnetic metal material are mixed with a matrix of a polymeric material or ceramics, wherein the magnetic particles are of an elliptic plate shape.

According to this constitution, since the magnetic particles are formed into an elliptic flat shape, the frequency limit can be increased to a high frequency band as exceeding 10 GHz, and a radiowave absorbent working at high frequency with high magnetic permeability characteristics can be obtained.

In a preferred constituent example, a plurality of radiowave absorbents of different radiowave absorption characteristics are formed by lamination.

In accordance with the this constitution, a radiowave absorbent reduced in the size and the thickness, capable of absorbing radiowaves in a plurality of frequency bands each at an optimal efficiency can be obtained by forming a plurality layers of radiowave absorbents by properly selecting various kinds of materials of different radiowave absorption characteristics.

In a preferred constituent example, it is formed into a sheet or paste shape.

In accordance with the constitution, a form easy to actual use as the radiowave absorbent can be obtained.

Further, the present invention provides a method of manufacturing a radiowave absorbent forming fine spherical particles comprising a soft magnetic metal material, colliding the fine spherical particles against an inclined flat surface by a gas jetting pressure to form magnetic particles of an elliptic plate shape, and mixing the magnetic particles of the elliptic plate shape with a matrix of a polymeric material or ceramics.

In accordance with this constitution, elliptic plate particles of uniform grain size with well arranged shape can be produced easily from spherical particles in a great amount, easily and efficiently and at a reduced cost.

In accordance with the present invention, the resonance frequency is increased making it possible to cope with the high frequency by making the form of the soft magnetic metal powder into the elliptic plate shape. The principle of the present invention is to be explained.

In the formula (1) described above, since the anisotropy HA1 within the plane of the disk is small, Fr($\mu$r−1) on the left side takes a large value since the anisotropy HA1 within the plane of the disk is small. Further, since the anisotropy is small in the plane, it is easily magnetized to obtain high permeability. However, since the value fr($\mu$r−1) is at a constant value, if the permeability $\mu$r takes an extremely large value, the value for the resonance frequency fr is small and the permeability is not extended as far as high frequency.

In this case, it is necessary to set the resonance frequency to a high frequency without lowering of the permeability so much. In view of the above, the form of the soft magnetic metal is changed from a circular to an elliptic shape and a weak configurational anisotropy is provided in the direction of the major axis of the ellipsis thereby attaining increase in the resonance frequency. This is because the resonance frequency is generally in proportion with the anisotropic magnetic field HA of the magnetic material as shown by the following equation (2).

$$f_r \propto H_A \tag{2}$$

While this somewhat lowers the permeability, since the energy loss shown by the following equation (3) increases by the increase in high frequency, this gives no significant effect on the radiowave absorption characteristic.

$$P = \frac{1}{2}\omega\mu_0\mu''|H^2| \tag{3}$$

in which P: radio wave absorption energy per unit volume (W/m$^3$) ω: angular frequency (=2πf), $\mu$0: permeability in vacuum, $\mu$": imaginary component of the complex permeability (magnetic loss), H: magnetic field intensity of electromagnetic waves applied externally.

DESCRIPTION OF THE PREFERRED EMBODIMENTS

A method of preparing a soft magnetic material of an elliptic plate shape according to this invention will be explained with reference to the drawings.

Figure 1:
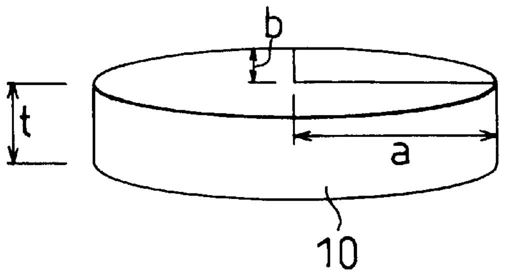
FIG. 1 is a view for the appearance of soft magnetic metal particles of an elliptic plate shape.

FIG. 1 is a view for the appearance of a soft magnetic metal particle of an elliptic plate shape.

In FIG. 1, 't' is the thickness of the plate for the elliptic plate particle 10, 'a' is a major axis of the ellipsis and 'b' is a minor axis of the ellipsis. The aspect ratio (b/a) is a value between 0 and 1 which can be adjusted depending on the preparation conditions. Further, the thickness 't' can also be adjusted by the preparing conditions and preferred characteristics are obtained when it is prepared between 0.1 to several um, which provides a thickness less than the skin depth.

Figure 2:
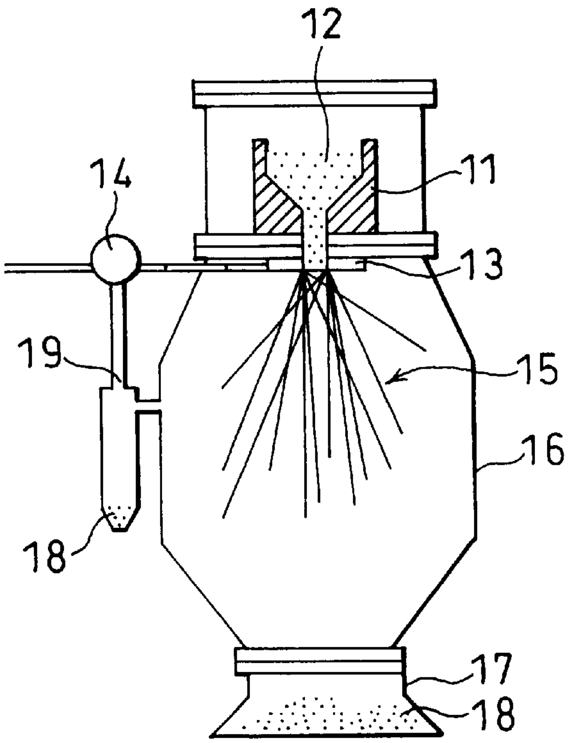
FIG. 2 is a schematic view illustrating a method of preparing an elliptic plate.

FIG. 2 is a schematic view showing a method of preparing the elliptic plate.

In the atomizing method, molten metal is dropped or blown out by a nozzle into a high speed fluid to form fine particles by the fluid in the course of cooling. In this case, grain size can be varied depending on the formation condition such as flow speed or metal blowing amount. Among the atomizing methods, a gas atomizing method is suitable to the preparation of truly spherical fine particles.

When molten metal 12 in a vacuum molten furnace 11 drops, an inert gas is supplied from a gas supply source 14 and, when the inert gas is jetted out of a nozzle 13, the liquid metal is pulverized and made spherical while keeping the liquid state and accumulates as liquid metal particles 15 in a collecting vessel 17. In this case, by adjusting the size and the inclination of the inner wall of a vessel 16 such that they collide against the inner wall of the vessel 16 in a liquid state as it is, the spherical liquid collides against the flat inclined surface and can be solidified after being formed into an elliptic plate.

A fine powder 18 as the plate particles obtained in this way is almost of an elliptic plate reflecting the truly spherical shape in the liquid state. Atomization is desirably conducted in an inert gas atmosphere for preventing oxidation caused by melting of the soft magnetic metal at high temperature. The inert gas can be used recyclically using a gas circulation channel 19, and the fine powder 18 contained in the gas stream in the gas circulation channel 19 can also be collected by providing an appropriate collecting space. The grain size can be adjusted by mainly controlling the gas pressure in the same manner as in the usual gas atomizing method and finer particles can be obtained as the gas pressure is higher.

For using the fine powder 18 thus formed having radiowave absorption characteristic for the EMI (Electromagnetic Interference) countermeasure of electronic equipments, since the powdery state is difficult to handle with, it is preferred to mix and form the fine powder 18 with various polymeric materials such as resin or rubber or a ceramic material into a shape easy to handle with. As the molding method, it is molded into a desired shape using a known molding method. That is, when it is fabricated into a sheet, a known doctor blade method or rolling method is used and when it is formed into a predetermined configuration, die molding is conducted. Alternatively, it may sometimes be used as a paste or in an indefinite shape.

By mixing with the ceramics, fine metal magnetic particles are stabilized by the shape retaining effect of the hard ceramic material to obtain a mixture of a stable shape in which the fine metal magnetic particles are stably bonded and held and containing fine magnetic particles. The mixture with the ceramics can be formed previously in accordance with the shape and the size to be used as the radiowave absorbent and can be attached as the radiowave absorbent as it is to a place of use.

Figure 3:
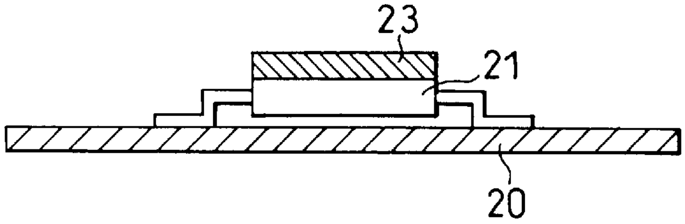
FIG. 3 is a schematic view when using a radio wave absorbent in a sheet shape.
Figure 4:
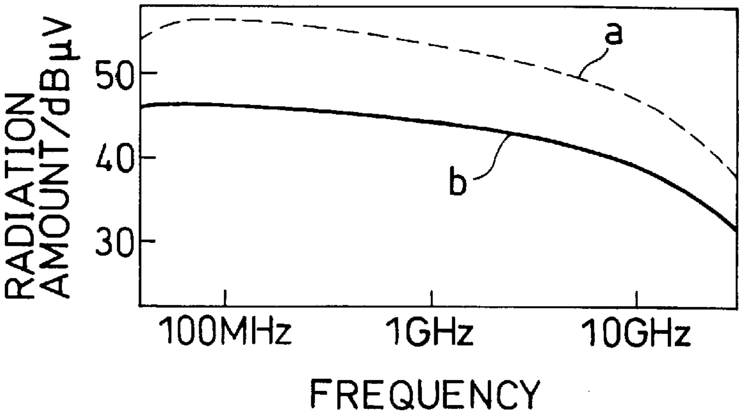
FIG. 4 is a graph illustrating a radiation noise level from an IC part.

FIG. 3 is a schematic view when the radiowave absorbent in the form of sheet is used and FIG. 4 is a graph illustrating a radiation noise level from an IC part in this case.

A composite body of an elliptic plate shaped soft magnetic metal powder and a resin formed as described above is formed into a sheet and appended on an IC part 21 mounted on a substrate 20, as the radiowave absorption sheet 23. The IC part 21 is a noise source and the filling rate of the fine powder 18 in the radiowave absorption sheet 23 is about 70 wt %. As the soft magnetic material, a permalloy alloy of Ni:Fe=28:72 was used.

As a result, as shown in FIG. 4, it can be seen that the radiation amount of noises from the IC part 21 appended with the radiowave absorption sheet 23 is decreased compared with a not appended with the radiowave absorption sheet 23. Further, the suppression effect is not decayed at high frequency exceeding 10 GHz and the radiation amount is further lowered. The place for appending the radiowave absorption sheet 23 is not restricted only on the IC part 21 but may be on interconnections such as leads or DC—DC converter.

Figure 5:
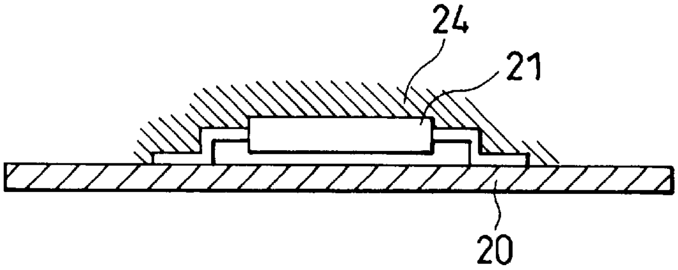
FIG. 5 is a schematic view when using a radio wave absorbent in a paste shape.

FIG. 5 is a schematic view using a radiowave absorbent formed into a paste.

As shown in the drawing, a radiowave absorption paste 24 as the soft magnetic metal powder paste of an elliptic plate according to this invention is coated to an IC part 21 as a noise source mounted on a substrate 20. The filling rate of the radiowave absorption paste 24 is about 75 wt %. Also in this case, the coated place is not restricted on the IC part 21 but may be on the interconnections or DC—DC converter in the same manner as the sheet. Alternatively, it maybe on the inside of the casing or in a slight space between the substrate and the casing of the set.

Figure 6:
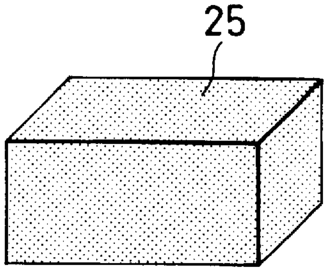
FIG. 6 is a schematic view of a radio wave absorption casing.
Figure 7:
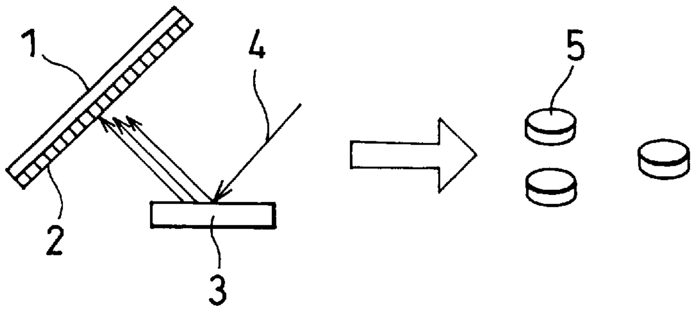
FIG. 7 is a schematic view illustrating a method of preparing a disk-like magnetic body from a thin film.
Figure 8:
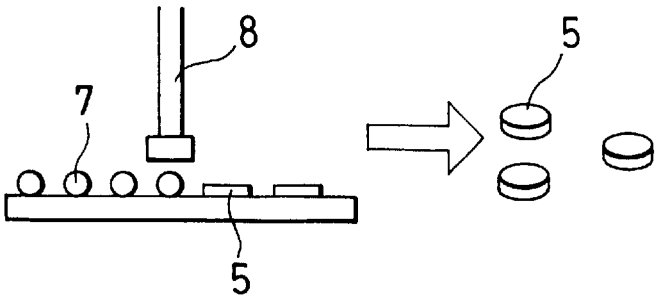
FIG. 8 is a schematic view illustrating a method of preparing a disk-like magnetic body from spherical powder particles.

FIG. 6 is a schematic view of a radiowave absorption casing.

As shown in the drawing, a radiowave absorption casing 25 is manufactured by mixing a radiowave absorbent according to this invention and a known polymeric material to form a plate body of an appropriate hardness and assembling the same as a casing. Electronic parts are contained within the casing. As the resin, known polymeric materials such as epoxy resin, phenol resin and liquid polymer are selected considering the bondability with the filling material and ease of moldability.

As explained above, in this invention, the frequency limit can be increased up to high frequency band in excess of 10 GHz by making the magnetic particles into an elliptic plate shape, by which a radiowave absorbent having high permeability characteristic at high frequency can be obtained and EMC problems up to this band can be solved. Further, elliptic particles of substantially uniform grain size with well arranged shape can be produced by a great amount easily and efficiently at a reduced cost by using a method of colliding spherical particles against the inclined surface by gas blowing, for example, by gas atomizing method as a method of preparing magnetic particles of an elliptic plate shape.

Further, the limit of the filling rate of the mixture to the matrix is generally effectuated greatly by the friction of filling material and, since the radiowave absorbent powder according to this invention is of a smooth elliptic plate shape, the friction is reduced and the amount of filling can be increased compared with flat flakes or flaky flakes.

What is claimed is:

1. A method of manufacturing a radio wave absorbent comprising:

forming a fine spherical particle comprised of a soft magnetic metal material; and colliding the fine spherical particle against an inclined flat surface to form a magnetic particle having a substantially elliptical shape.

2. The method according to claim 1 wherein the colliding step includes emitting a gas from a nozzle to accelerate the fine spherical particle towards the inclined flat surface.

3. The method according to claim 1 including mixing the magnetic particle with a polymeric material to form a mixed material.

4. The method according to claim 3 wherein the polymeric material is a rubber.

5. The method according to claim 3 wherein the polymeric material is a resin.

6. The method according to claim 1 including mixing the magnetic particle with a ceramic material to form a mixed material.

7. The method according to claim 3 further including molding the mixed material into a sheet.

8. A radio wave absorber including a plurality of layers, each layer being comprised of a mixture having a substantially elliptical soft magnetic material particle and a polymeric material, wherein the mixture in each of the plurality of layers has a radio wave absorption characteristic that is different from each of the other layers;

wherein the plurality of layers is formed by lamination.

9. The radio wave absorber of claim 8 wherein the radio wave absorber has a frequency limit greater than 10 GHz.

10. The radio wave absorber of claim 8 wherein the radio wave absorber is produced as a sheet.

11. The radio wave absorber of claim 10 wherein the mixture has a filling rate of approximately 70% by weight.

* * * * *